US008948715B2

(12) United States Patent
Bakhri et al.

(10) Patent No.: US 8,948,715 B2
(45) Date of Patent: Feb. 3, 2015

(54) RADIO RECEIVER WITH ADAPTIVE TUNER

(75) Inventors: Syaiful Bakhri, Singapore (SG); Wei Ming Dan Chia, Singapore (SG); Brian Sunil Nicholas Fernandes, Singapore (SG); Mintak Lee, Johor Bahru (MY); Yinn Sinn Tang, Johor Bahru (MY); Ye Yuan, Singapore (SG)

(73) Assignee: Continental Automotive GmbH, Hannover (DE)

( * ) Notice: Subject to any disclaimer, the term of this patent is extended or adjusted under 35 U.S.C. 154(b) by 27 days.

(21) Appl. No.: 13/882,949

(22) PCT Filed: Nov. 1, 2010

(86) PCT No.: PCT/IB2010/054929

§ 371 (c)(1), (2), (4) Date: Jul. 19, 2013

(87) PCT Pub. No.: WO2012/059782

PCT Pub. Date: May 10, 2012

(65) Prior Publication Data

US 2013/0288625 A1 Oct. 31, 2013

(51) Int. Cl.

*H04B 1/18* (2006.01)
*H04B 1/16* (2006.01)
*H04B 1/08* (2006.01)

(52) U.S. Cl.

CPC . *H04B 1/16* (2013.01); *H04B 1/082* (2013.01)
USPC .... 455/150.1; 455/77; 455/178.1; 455/173.1; 455/182.3; 455/191.1

(58) Field of Classification Search

CPC .................................. H04B 1/082; H04B 1/16
USPC ............ 455/77, 150.1, 178.1, 191.1, 280, 73, 455/130, 160.1, 173.1, 182.3, 184.1
See application file for complete search history.

(56) References Cited

U.S. PATENT DOCUMENTS

| | | | | |
|---|---|---|---|---|
| 6,647,245 | B1 * | 11/2003 | Rosenbaum | 455/45 |
| 2003/0236096 | A1 | 12/2003 | Yamazaki | |
| 2005/0157885 | A1 | 7/2005 | Olney et al. | |
| 2005/0181755 | A1 | 8/2005 | Hoshino | |
| 2005/0227656 | A1 | 10/2005 | Zahm et al. | |
| 2006/0271246 | A1 | 11/2006 | Bell et al. | |
| 2007/0135978 | A1 | 6/2007 | Kim et al. | |

(Continued)

FOREIGN PATENT DOCUMENTS

| | | | |
|---|---|---|---|
| DE | 20 2004 005 208 | U1 | 9/2004 |
| EP | 1 555 754 | A1 | 7/2005 |

(Continued)

*Primary Examiner* — Tuan Pham
(74) *Attorney, Agent, or Firm* — Cozen O'Connor

(57) ABSTRACT

A mobile radio receiver for a vehicle. The mobile radio receiver includes a tuner front-end section, a location data port, a sensor port, and a data processing unit. The location data port is used for receiving tuner location data. The sensor port is used for receiving one or more sensor signals. The data processing unit is operably connected with the tuner front-end section, with the location data port, and with the sensor port. The data processing unit further comprises predetermined tuner location data and predetermined relationship data sets for determining a set of tuner front-end section parameters based on the sensor signals. The mobile radio receiver provides an operational mode, a checking mode, a tuner parameter adjustment mode, and a tuner parameter application mode.

18 Claims, 13 Drawing Sheets

(56) References Cited

U.S. PATENT DOCUMENTS

| | | | | |
|---|---|---|---|---|
| 2008/0081582 | A1 * | 4/2008 | Rofougaran | 455/193.1 |
| 2008/0119148 | A1 | 5/2008 | Ray | |
| 2011/0034139 | A1 * | 2/2011 | Xuan et al. | 455/179.1 |
| 2014/0194079 | A1 * | 7/2014 | Bakhri et al. | 455/160.1 |

FOREIGN PATENT DOCUMENTS

| | | | |
|---|---|---|---|
| EP | 1 564 909 | A2 | 8/2005 |
| KR | 2003-0028297 | | 4/2003 |
| KR | 2003-0028297 | A | 4/2003 |

* cited by examiner

| | Parameter Recording and Logging | | | | | | | | | | |
|---|---|---|---|---|---|---|---|---|---|---|---|
| | Time Stamp 1 | Time Stamp 2 | Time Stamp 3 | Time Stamp 4 | Time Stamp 5 | Time Stamp ... | Time Stamp ... | Time Stamp ... | Time Stamp ... | Time Stamp N | |
| Multipath | X1 | XX1 | .... | .... | .... | .... | .... | .... | .... | .... | DSP/Baseband 21 |
| RF SNR | X2 | XX2 | .... | .... | .... | .... | .... | .... | .... | .... | |
| Tuner Signal Strength | X3 | XX3 | .... | .... | .... | .... | .... | .... | .... | .... | |
| Ref Altitude | X4 | XX4 | .... | .... | .... | .... | .... | .... | .... | .... | HMI 23 |
| Current Selected Channel | X5 | XX5 | .... | .... | .... | .... | .... | .... | .... | .... | |
| Updation Rate | X6 | XX6 | .... | .... | .... | .... | .... | .... | .... | .... | |
| Speed | X7 | XX7 | .... | .... | .... | .... | .... | .... | .... | .... | accelerometer 26 |
| Acceleration | X8 | XX8 | .... | .... | .... | .... | .... | .... | .... | .... | |
| Angle to Horizontal | X9 | XX9 | .... | .... | .... | .... | .... | .... | .... | .... | gyro 28 |
| Direction | X10 | XX10 | .... | .... | .... | .... | .... | .... | .... | .... | |
| Location Data | X11 | XX11 | .... | .... | .... | .... | .... | .... | .... | .... | GPS 30 |
| Current Altitude | X12 | XX12 | .... | .... | .... | .... | .... | .... | .... | .... | |
| GPS Signal Strength | X13 | XX13 | .... | .... | .... | .... | .... | .... | .... | .... | |
| No Of Satellites | X14 | XX14 | .... | .... | .... | .... | .... | .... | .... | .... | |
| TMC | X15 | XX15 | .... | .... | .... | .... | .... | .... | .... | .... | TMC 32 |
| WX Band | X16 | XX16 | .... | .... | .... | .... | .... | .... | .... | .... | |
| Audio SNR | X17 | XX17 | .... | .... | .... | .... | .... | .... | .... | .... | audio 34 |
| Audio Level | X18 | XX18 | .... | .... | .... | .... | .... | .... | .... | .... | |

Fig. 3

| Parameter Limits and Tuner Coefficient Update Check | | Current Value from the parameter Recording and Log | Tuner Coefficient Checking Algorithm | | | |
|---|---|---|---|---|---|---|
| Parameter | Limit Setting | Current Measured Value | Limit Low | Initial value | Limit High | Update Criteria |
| Multipath | L1 | X1 | Initial 1 - L1 | Initial 1 | Initial 1 + L1 | If X1 is greater than Limit High or less than Limit Low then Update the Tuner Coefficients |
| RF SNR | L2 | X2 | Initial 2 - L2 | Initial 2 | Initial 2 + L1 | If X2 is greater than Limit High or less than Limit Low then Update the Tuner Coefficients |
| Tuner Signal Strength | L3 | X3 | Initial 3 - L3 | Initial 3 | Initial 3 + L1 | If X3 is greater than Limit High or less than Limit Low then Update the Tuner Coefficients |
| Ref Altitude | L4 | X4 | Initial 4 - L4 | Initial 4 | Initial 4 + L1 | If X4 is greater than Limit High or less than Limit Low then Update the Tuner Coefficients |
| Current Selected | L5 | X5 | Initial 5 - L5 | Initial 5 | Initial 5 + L1 | If X5 is greater than Limit High or less than Limit Low then Update the Tuner Coefficients |
| etc... | L6 | X6 | Initial 6 - L6 | Initial 6 | Initial 6 + L1 | If X6 is greater than Limit High or less than Limit Low then Update the Tuner Coefficients |

DSP/ Baseband 2.1

HMI 2.3

| | Parameter Correlation | | | | | | | | | | | | | | | | | |
|---|---|---|---|---|---|---|---|---|---|---|---|---|---|---|---|---|---|---|
| | Multipath | RF SNR | Tuner Signal Strength | Ref Altitude | Current Selected Channel | Updation Rate | Speed | Acceleration | Angle to Horizontal | Direction | Location Data | Current Altitude | GPS Signal Strength | No Of Satellites | TMC | WX Band | Audio SNR | Audio Level |
| Multipath | 1 | AA1 | ... | ... | ... | ... | ... | ... | ... | ... | ... | ... | ... | ... | ... | ... | ... | ... |
| RF SNR | A1 | 1 | ... | ... | ... | ... | ... | ... | ... | ... | ... | ... | ... | ... | ... | ... | ... | ... |
| Tuner Signal Strength | A2 | AA2 | 1 | ... | ... | ... | ... | ... | ... | ... | ... | ... | ... | ... | ... | ... | ... | ... |
| Ref Altitude | A3 | AA3 | ... | 1 | ... | ... | ... | ... | ... | ... | ... | ... | ... | ... | ... | ... | ... | ... |
| Current Selected Channel | A4 | AA4 | ... | ... | 1 | ... | ... | ... | ... | ... | ... | ... | ... | ... | ... | ... | ... | ... |
| Updation Rate | A5 | AA5 | ... | ... | ... | 1 | ... | ... | ... | ... | ... | ... | ... | ... | ... | ... | ... | ... |
| Speed | A6 | AA6 | ... | ... | ... | ... | 1 | ... | ... | ... | ... | ... | ... | ... | ... | ... | ... | ... |
| Acceleration | A7 | AA7 | ... | ... | ... | ... | ... | 1 | ... | ... | ... | ... | ... | ... | ... | ... | ... | ... |
| Angle to Horizontal | A8 | AA8 | ... | ... | ... | ... | ... | ... | 1 | ... | ... | ... | ... | ... | ... | ... | ... | ... |
| Direction | A9 | AA9 | ... | ... | ... | ... | ... | ... | ... | 1 | ... | ... | ... | ... | ... | ... | ... | ... |
| Location Data | A10 | AA10 | ... | ... | ... | ... | ... | ... | ... | ... | 1 | ... | ... | ... | ... | ... | ... | ... |
| Current Altitude | A11 | AA11 | ... | ... | ... | ... | ... | ... | ... | ... | ... | 1 | ... | ... | ... | ... | ... | ... |
| GPS Signal Strength | A12 | AA12 | ... | ... | ... | ... | ... | ... | ... | ... | ... | ... | 1 | ... | ... | ... | ... | ... |
| No Of Satellites | A13 | AA13 | ... | ... | ... | ... | ... | ... | ... | ... | ... | ... | ... | 1 | ... | ... | ... | ... |
| TMC | A14 | AA14 | ... | ... | ... | ... | ... | ... | ... | ... | ... | ... | ... | ... | 1 | ... | ... | ... |
| WX Band | A15 | AA15 | ... | ... | ... | ... | ... | ... | ... | ... | ... | ... | ... | ... | ... | 1 | ... | ... |
| Audio SNR | A16 | AA16 | ... | ... | ... | ... | ... | ... | ... | ... | ... | ... | ... | ... | ... | ... | 1 | ... |
| Audio Level | A17 | AA17 | ... | ... | ... | ... | ... | ... | ... | ... | ... | ... | ... | ... | ... | ... | ... | 1 |

| Tuner Parameter | | Tuner Settings Calculation | | | | | | | | | | | | | | | | | |
|---|---|---|---|---|---|---|---|---|---|---|---|---|---|---|---|---|---|---|---|
| | | Multipath | RF SNR | Tuner Signal Strength | Ref Altitude | Current Selected Channel | Updation Rate | Speed | Acceleration | Angle to Horizontal | Direction | Location Data | Current Altitude | GPS Signal Strength | No Of Satellites | TMC | WX Band | Audio SNR | Audio Level |
| Softmute | Level | | | | | | | | | | | | | | | | | | |
| Softmute | Multipath | | | | | | | | | | | | | | | | | | |
| Softmute | USN | | | | | | | | | | | | | | | | | | |
| Softmute | External | | | | | | | | | | | | | | | | | | |
| Stero Blend | Level | | | | | | | | | | | | | | | | | | |
| Stero Blend | Multipath | | | | | | | | | | | | | | | | | | |
| Stero Blend | USN | | | | | | | | | | | | | | | | | | |
| Stero Blend | External | | | | | | | | | | | | | | | | | | |
| High Cut | Level | | | | | | | | | | | | | | | | | | |
| High Cut | Multipath | | | | | | | | | | | | | | | | | | |
| High Cut | USN | | | | | | | | | | | | | | | | | | |
| High Cut | External | | | | | | | | | | | | | | | | | | |
| High Blend | Level | | | | | | | | | | | | | | | | | | |
| High Blend | Multipath | | | | | | | | | | | | | | | | | | |
| High Blend | USN | | | | | | | | | | | | | | | | | | |
| High Blend | External | | | | | | | | | | | | | | | | | | |
| AGC Gain | Level | | | | | | | | | | | | | | | | | | |
| AGC Gain | Multipath | | | | | | | | | | | | | | | | | | |
| AGC Gain | USN | | | | | | | | | | | | | | | | | | |
| AGC Gain | External | | | | | | | | | | | | | | | | | | |
| Overload | Level | | | | | | | | | | | | | | | | | | |
| Overload | Multipath | | | | | | | | | | | | | | | | | | |
| Overload | USN | | | | | | | | | | | | | | | | | | |
| Overload | External | | | | | | | | | | | | | | | | | | |
| Overload | Level | | | | | | | | | | | | | | | | | | |
| Overload | Multipath | | | | | | | | | | | | | | | | | | |
| Overload | USN | | | | | | | | | | | | | | | | | | |
| Overload | External | | | | | | | | | | | | | | | | | | |

Fig. 6

| Dimension | dBuV | % | % | % | C | Kmph | dB |
|---|---|---|---|---|---|---|---|
| Parameter | SNR | Multipath | Ultrasonics | Humidity | Temperature | Car Speed | Noise |

PARTICULAR EXAMPLE @ Chicago at 12.00pm

| 40 | 50 | 20 | 60 | 25 | 60 | -55 |
|---|---|---|---|---|---|---|

Fig. 9

| | SNR dBuV | Multipath % | Ultrasonic Noise % | Humidity % | Temperature C | Car Speed Kmph | Noise dB |
|---|---|---|---|---|---|---|---|
| SNR | 1 | 1/x | 0 | 0 | 0 | 0 | 0 |
| Multipath | e^x | 1 | 0.2 | 0 | 0 | 0 | 0 |
| Ultrasonic Noise | e^x | 0.4 | 1 | 0 | 0 | 0 | 0 |
| Humidity | 0.1 | e^-x | e^-x | 1 | 1/x | 0 | 0.2 |
| Temperature | 1/e^x | 1/e^x | 1/e^x | 1/x | 1 | 0 | x |
| Car Speed | 0.1 | 0.3 | 0.3 | 0 | 0 | 1 | 0.1 |
| Noise | 1/x | 2 | 0.5 | 0 | 0 | 0 | 1 |

Fig. 10

| | RF Gain dB | IF Gain dBuV | RF Selectivity % | IF Selectivity % | Softmute dB | High Cut kHz | High Blend Khz | Overload dBuV |
|---|---|---|---|---|---|---|---|---|
| SNR | 1/x | 1/x-1 | 2 | 3 | e^-x | 1-e^x | 10-e^x | 10-e^x |
| Multipath | x | 0.3 | 0.1 | 0.2 | 0.05 | 2.3 | 0.05 | 0.05 |
| Ultrasonic Noise | 0.1 | 0.1 | 0.1 | 0.1 | 0.1 | 0.1 | 0.1 | 0.1 |
| Humidity | 0.2 | 0.3 | 0.01 | 0.01 | 0.1 | 0.01 | 0.06 | 0.6 |
| Temperature | 0.1 | 0.1 | 0.1 | 0.1 | 0.1 | 0.1 | 0.3 | 0.1 |
| Car Speed | 1/x | 1/x | e^0.5 | e^0.1 | 0.5 | 0.6 | 3 | 1 |
| Noise | e^0.2 | 0.1 | 0.1 | 0.1 | 0.1 | e^-x | 0.05 | 0.1 |

Fig. 11

| RF Gain dB | IF Gain dBuV | RF Selectivity % | IF Selectivity % | Softmute dB | High Cut kHz | High Blend Khz | Overload dBuV |
|---|---|---|---|---|---|---|---|
| y1 | y2 | y3 | y4 | y5 | y6 | y7 | y8 |

@Chicago
@ 12.00pm

Fig. 12

RADIO RECEIVER WITH ADAPTIVE TUNER

CROSS REFERENCE TO RELATED APPLICATIONS

This is a U.S. national stage of application No. PCT/IB2010/054929, filed on 1 Nov. 2010.

BACKGROUND OF THE INVENTION

1. Field of the Invention

This application relates to a radio receiver with a tuner. In particular, the application relates to a radio receiver for a vehicle.

2. Description of Prior Art

Automotive vehicles are commonly equipped with radios for receiving wireless broadcast radio frequency (RF) signals. These radios process the received RF signals and then broadcast audio sounds together with other information to passengers in the vehicles while the automotive vehicles travel amongst various locations.

The radio typically includes various electronics that comprises an RF tuner. The RF tuner selects a frequency bandwidth of input RF signals and outputs audio signals. The audio signals are typically amplified for broadcasting via audio speakers. The RF tuner may include a frequency modulated (FM) module for receiving FM modulated signals and an amplitude modulated (AM) module for receiving AM signals.

Conventional vehicle radio receivers are typically programmed with preset tuning parameters that determine tuner settings. The tuning parameters typically include parameters that adjust gain of an automatic gain control (AGC), parameters that adjust intermediate frequency (IF) bandwidth, parameters that adjust audio channel separation, parameters that adjust audio high frequency roll off, and parameters that adjust audio amplitude. The preset tuning parameters typically do not change and are initially selected in an attempt to accommodate a wide range of signal reception conditions.

SUMMARY OF THE INVENTION

It is an object of the application to provide an improved tuner unit.

It is believed that performance of a tuner can be improved by using its actual performance information to generate new tuner parameters with pre-determined tuner relationship information.

The application provides a mobile radio receiver for a vehicle, such as a car, a ship, or an aircraft.

The mobile radio receiver includes a tuner front-end section, a location data port, a sensor port, and a data processing unit. The term location refers to a geographical area or region and not to specific geographical point. Put differently, the location can relate to geographical coordinates defining a region or an area, such as Europe, India, China, or North America.

The tuner front-end section is used for receiving radio signals from an antenna and for processing the received radio signals. The tuner front-end section provides hardware that can be adjusted according to input front-end section parameters, such as gain or attenuation. The adjustment can be done by a programmable tuner front-end integrated circuit through settings of software parameters or by using a D/A (digital to analog) converter.

The location data port is used for receiving tuner location data.

The sensor port is used for receiving one or more sensor signals. The sensor signals can originate from one or more internal or external measuring devices. The internal measuring devices generate internal measurement signals that are derived from radio signals received after an antenna plug. The internal measurement signals can include a front-end section signal or an audio signal that is produced after the front-end section, wherein the measurement signals can relate to Signal to Noise Ratio (SNR), Total Harmonic Distortion (THD), multipath, or field strength. In contrast, the external measuring devices are provided by external sensors for measuring external conditions, such as ambient weather parameter, examples of this are temperature and humidity. Another example the external conditions relate to signal strength that is measured by a microphone.

The data processing unit is operably connected with the tuner front-end section, the location data port, and the sensor port. The data processing unit includes a processor, such as a microprocessor or an audio signal Digital Signal Processor.

The data processing unit also includes two or more predetermined tuner location data and two or more predetermined relationship data sets for determining a set of tuner front-end section parameters based on the sensor signals.

The tuner location data and the relationship data sets are often stored using a tuner parameter database. In a special case, the relationship data set comprises only one single tuner front-end section parameter. The predetermined relationship data set together with a predetermined data operation defines a relationship between the sensor signal and the tuner front-end section parameters.

The mobile radio receiver provides an operational mode, a checking mode, a tuner parameter adjustment mode, and a tuner parameter application mode.

One or more of the modes may occur at the same time. For example, the operational mode and the checking mode can occur at the same time. From time to time or depending on the sensor signals, the mobile radio receiver enters the checking mode, while still operating in the operational mode.

In particular, in the operational mode, the tuner front-end section operates according to one or more sets of tuner front-end section parameter.

In the checking mode, the data processing unit receives the sensor signals and it checks the sensor signals against one or more pre-determined thresholds. In many cases, the mobile radio receiver enters or changes to the parameter adjustment mode when one or more sensor signals exceed the threshold whilst the mobile radio receiver enters the operational mode when the sensor signal data falls or drops below the threshold.

In the parameter adjustment mode, the data processing unit determines a new set of tuner front-end section parameters based on the tuner location data, on the above-mentioned relationship data set, and on the sensor signal. The present sets of the tuner front-end section parameter are often updated with the new set of tuner front-end section members. After this, the mobile radio receiver often enters the parameter application mode.

In the parameter application mode, the data processing unit updates the tuner front-end section with the new set of tuner front-end section parameters. The mobile radio receiver later often enters the operational mode.

The tuner location data can include actual geographic data, actual time data, or both actual geographic data and actual time data. The geographic data, the time data, or both can be used for retrieving or selecting the relationship data sets. This allows for an improved receiver, especially when location comprises actual time, because during night time the correlation between sensor values may be different than the correlation during daytime.

In a special case, the tuner location data includes data related to signal conditions of a location. Examples of the signal condition data are location data of radio transmitters and structures affecting radio signals such as tall buildings and tunnels.

In a database type of implementation, the data processing unit includes two or more tuner parameter records. Each tuner parameter record comprises a predetermined tuner location data and a predetermined relationship data set. In the parameter adjustment mode, the data processing unit determines a new set of tuner front-end section parameters by retrieving a tuner parameter record using the tuner location data. The new tuner front-end section parameters are then generated with this tuner parameter record.

In one embodiment, the relationship between the sensor data and the tuner front-end section parameters is kept in at least two individual data sets. This provides an improved operation as compared with a receiver that provides only one single relationship between the sensor data and the tuner front-end section parameters, which is often adjusted at the time of producing the receiver. While the performance of a receiver with a set relationship between the sensor data and the tuner front-end section parameters can only be improved marginally by controlling parameters such as RF gain or IF gain, the application provides a set of radios with very different characteristics. For instance, according to one data set for determining the tuner front-end section parameters, the attenuator and the RF selectivity would be fully set in order to cope with two strong and interfering transmitters that are in close vicinity of the radio receiver. According to another data set for determining the tuner front-end section parameters, the attenuator would be set to zero and the RF selectivity would be set to "broad", while the IF selectivity is set to "narrow" in order to listen to a weak signal from a single distant transmitter.

The data processing unit can include a pre-determined set of correlations among two or more sensor signals. This set of correlation is then used to determine a new set of tuner front-end section parameters. Specifically, in the parameter adjustment mode, the data processing unit determines a new set of tuner front-end section parameters based on the tuner location data, on a relationship data set, on the sensor signal, and on the set of correlations.

Often, the data processing unit comprises two or more correlation records. Each correlation record includes a pre-determined tuner location data and a pre-determined set of correlations.

In the parameter adjustment mode, the data processing unit determines a new set of tuner front-end section parameters by retrieving the correlation record using the tuner location data. The new tuner front-end section parameters are then generated with the set of correlation of this correlation record.

To cater for situations when the mobile radio receiver travels to a new location, the checking mode often includes a step of the data processing unit checking the tuner location data against predetermined location data. The mobile radio receiver enters the parameter adjustment mode when the tuner location data is different than the predetermined location data. This allows the mobile radio receiver to adjust its parameters when the mobile radio receiver enters a new location.

In practice, the tuner front-end parameters often comprise a signal sensitivity parameter. The signal sensitivity is intended for adjusting a gain, attenuation, or multipath parameter of the tuner front-end section.

The mobile radio receiver can include an input device, such as a touch screen or a button, for receiving an input from a user. The input can be used receive permission for the user to accept or to use the new tuner front-end parameter.

The data processing unit can include user preference data. This data has user preference information and can be used for determining acceptance of the new tuner front-end section parameter.

The application also provides a method of operating a mobile radio receiver for a vehicle.

The method comprises an operation, a check, a parameter adjustment, and a parameter application.

The operation comprises operating a front-end section of the mobile radio receiver according to at least one predetermined tuner front-end section parameter. The mobile radio receiver then often performs the check.

The check comprises an act of receiving one or more sensor signals from a sensor port. The sensor signals are then checked against one or more pre-determined corresponding thresholds by a data processing unit. The mobile radio receiver then performs the parameter adjustment when one of the sensor signals exceeds its corresponding threshold. Similarly, the mobile radio receiver performs the operation when the sensor signals falls or drops below its corresponding thresholds.

The parameter adjustment comprises determining or generating a new set of tuner front-end section parameter based on the tuner location data, on a relationship data set, and on the sensor signal by the data processing unit. The relationship data set is used for determining a set of tuner front-end section parameters based on the at least one sensor signal. The mobile radio receiver often then performs the parameter application.

The parameter application comprises updating the tuner front-end section with the new set of tuner front-end section parameter together with its corresponding tuner location data by the data processing unit. The mobile radio receiver often later performs the operation.

The operation can comprise an act or step of recording sensor signal data into a memory unit of the data processing unit.

The sensor signal data can be recorded together with its corresponding time stamp data. This provides a time parameter for adjusting a tuner parameter. The recorded sensor signal data can be averaged to reduce effects of glitches or one-time events.

The check can include an act of checking the tuner location data against pre-determined location data by the data processing unit. The mobile radio receiver then enters the parameter adjustment act when the tuner location data is significantly different from the pre-determined location data. The term significant is in reference to a notable audio influence that is decided by a user of the mobile radio receiver.

The parameter adjustment can comprise an act of requesting permission from a user to apply or use the new tuner front-end parameter.

The parameter adjustment can comprise checking whether the new tuner front-end parameter is different significantly from the predetermined tuner front-end parameter. The mobile radio receiver then enters the operation when the checking determines that the new tuner front-end parameter is essentially same as the pre-determined tuner front-end parameter.

In short, this application provides a method to improve tuner unit performance. The method includes a step of a tuner unit recognizing characteristics of a tuner unit for an automobile system. The tuner unit then adjusts intelligently its tuner unit characteristics to improve tuner unit performance. The adjustments are intelligent in that the tuner unit characteristics are adapted dynamically according to actual tuner unit performance.

The method also uses locations of the automobile systems, which are already provided by component blocks of the automobile system. The method is capable of improving tuner unit performance using one single tuner without additional investment in existing automotive infrastructure.

This application provides a device to improve tuner unit performance. The device includes parts that are similar to parts of many existing implementations of automobiles. The device also has pre-calibrated data that serves as initial settings of the tuner unit and an algorithm for intelligent processing of received signals. The processing is intelligent in that parameters of the tuner unit adapt dynamically according to actual tuner unit performance.

In addition, the tuner unit parameters are then stored according to regions, which are pre-defined or predetermined in a module of the device. As automobile carrying the device travels to a particular region, the device would use the stored tuner unit parameters of the particular region. The tuner unit may request confirmation of the new tuner parameters from the user before storing and before using the new tuner parameters.

These above steps are done repeatedly to improve further the tuner unit performance. Therefore, the regions used more frequently by the end-user would have better tuner unit performance.

The improved tuner unit performance has an advantage of improving driver experience and improving ease of getting audio and information from tuner stations due to better tuner unit performance.

This is different from most current implementations of radio and navigation systems in which their tuners are adjusted with the use of field-testing. This field-testing uses one fixed test route to cover requirements of customers who may reside in different regions and in different countries.

The test route is used to provide a majority of scenarios or environmental and signal conditions, which include a perceived worst-case scenario that the tuner would be subjected to. In other words, the field-testing adjusts or improves a tuner performance based on one fixed test route. However, in use, the test route is not able to cover all environmental and signal conditions that these tuners would face due to many variations in operating environmental conditions and due to many variations in weak or in strong interfering points from signal transmitters of radio broadcasting stations.

In the following description, details are provided to describe embodiments of the application. It shall be apparent to one skilled in the art, however, that the embodiments may be practiced without such details.

BRIEF DESCRIPTION OF THE DRAWINGS

Some parts of the embodiments, which are shown in the Figs. below, have similar parts. The similar parts may have the same names or the similar part numbers. The description of such similar parts also applies by reference to other similar parts, where appropriate, thereby reducing repetition of text without limiting the disclosure.

FIG. 3 is a table to record data of the tuner unit of FIG. 1;

FIG. 4 is a table of limits for the recorded data of FIG. 3;

FIG. 5 is a table for correlating parameters of the tuner unit of FIG. 1;

FIG. 6 is a table for calculating coefficients of the parameters of the tuner unit of FIG. 1;

FIG. 9 illustrates a possible matrix of audio performance measurements for the tuner unit of FIG. 1, FIG. 10 is a possible matrix of relations among parameters of the tuner unit of FIG. 1;

FIG. 11 is a possible matrix of relationships between tuner unit parametric settings and tuner unit performance parameters for the tuner unit of FIG. 1;

FIG. 12 is a possible matrix of new tuner parameters that is produced by the matrixes of FIGS. 9 to 11.

FIG. 1 shows an improved tuner unit 10 that includes a plurality of hardware blocks being electrically connected to a micro-controller 13.

Figure 1:
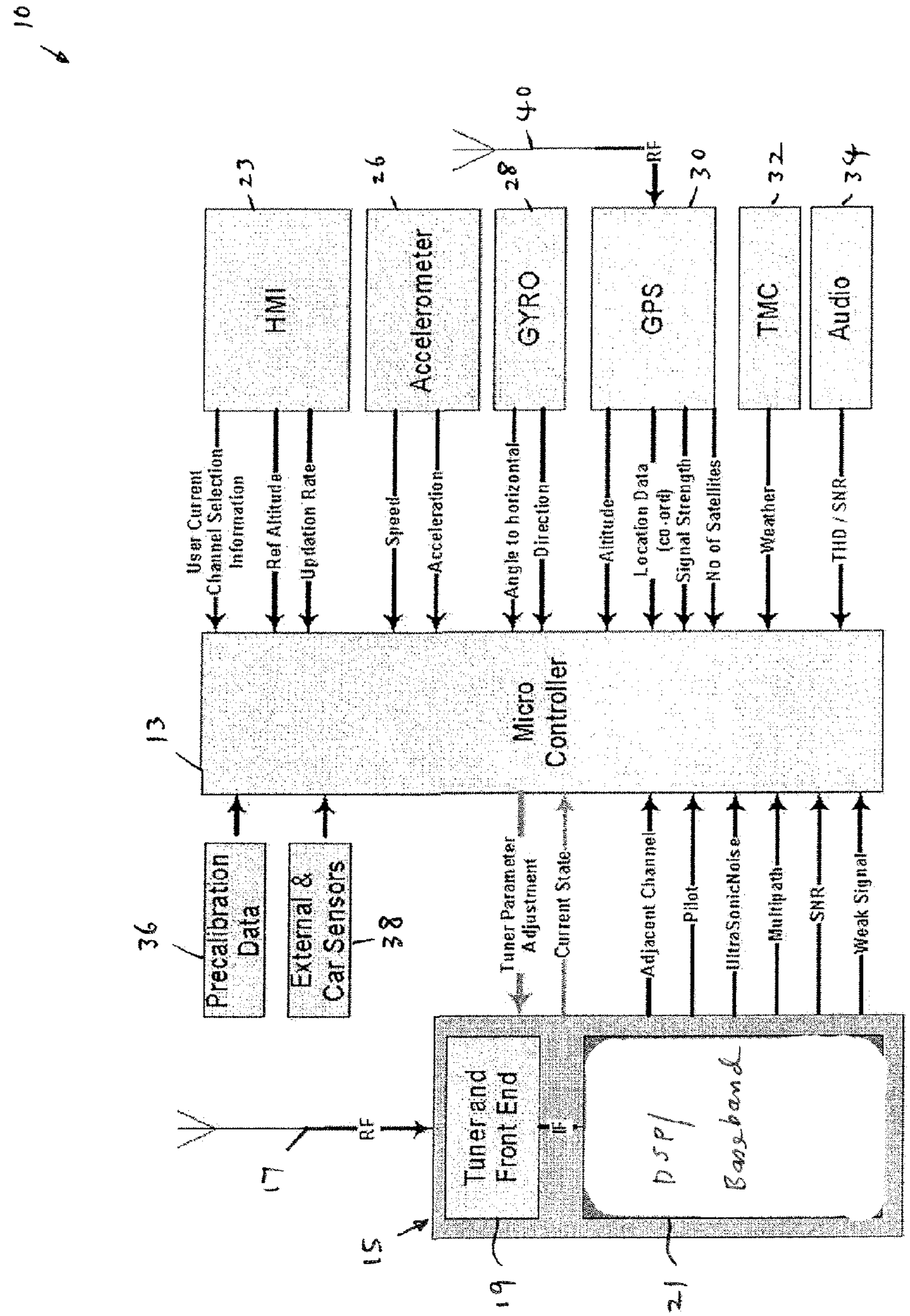
FIG. 1 is a block diagram of an improved tuner unit.

The hardware blocks comprise a tuner module 15 with an antenna 17. The tuner module 15 includes a tuner front-end unit 19 being electrically connected to a Digital Signal Processor (DSP) baseband unit 21. The hardware blocks also include a Human Machine Interface (HMI) module 23, an accelerometer module 26, a gyro module 28, a Global Positional System (GPS) module 30, a Traffic Message Channel (TMC) module 32, and an audio module 34. In addition, the hardware blocks include a memory module 36 storing pre-calibration data and multiple external and internal car sensors 38. An antenna 40 is connected to the GPS module 30.

The external and internal car sensors 38 include internal sensors located inside a car for measuring, for example, car engine rotating speed and external sensors located outside a car for measuring, for example, temperature, light condition, or humidity.

In use, the tuner unit 10 is intended for installation in an automobile. The tuner 10 receives RF (radio frequency) wireless signals and outputs audio signals using the received RF wireless signals.

A DSP device of the DSP baseband unit 21 allows the tuner front-end unit 19 to be controlled through software parameters. The parameters of the tuner unit are used for configuring the tuner unit 10. The parameters are also called coefficients. One example of such parameters relates to signal sensitivity. The DSP baseband unit 21 is also intended for connected a loudspeaker, which is not illustrated in FIG. 1.

Audio performance information of the tuner unit 10 is provided by the tuner module 15 and the audio module 34.

The performance information provides an indication of the quality of output audio signal that is produced by the tuner unit 10. One example of the performance information is signal to noise ratio (SNR) data.

Environmental information of the tuner unit 10 is provided by the accelerometer module 26, by the gyro module 28, by the GPS module 30, and by the external car sensors. The environmental information relates to external factors that influences the audio performance of the tuner unit 10. Examples of the environmental information are location information of nearby transmitter and information about surrounding weather conditions. Information from the HMI module 23, the TMC module 32 and the audio module 34 can also be included in the environmental information.

Both the tuner performance information and the environmental information can be used to improve audio performance of the tuner unit 10.

In particular, the DSP baseband unit 21 provides adjacent channel information, pilot information, ultra-sonic noise information, multipath information, signal to noise ratio (SNR) information, and weak signal information to the micro-controller 13. The multipath information is provided from the DSP baseband unit 21 using multipath metric.

The tuner front-end unit 19 provides current state information to the microcontroller 13 whilst the microcontroller 13 provides tuner parameter adjustment information to the tuner front-end unit 19.

The HMI module 23 provides user current channel selection information, reference altitude information, and update rate information to the microcontroller 13. The accelerometer 26 provides speed information and acceleration information to the micro-controller 13. The gyro module 28 provides angle to horizontal information and direction information to the microcontroller 13. The GPS module 30 provides altitude information, location data information, signal strength information, and number of satellite information to the microcontroller 13. The TMC module 32 provides real-time traffic and weather information to the microcontroller 13. The audio module 34 acts as a DSP (Digital Signal Processor) to provide Total Harmonic Distortion (THD) information as well as to provide signal to noise ratio (SNR) information to the micro-controller 13.

The audio module 34 also acts to receive data from an external microphone, from a speaker output or from both the external microphone and the speaker output.

Figure 2:
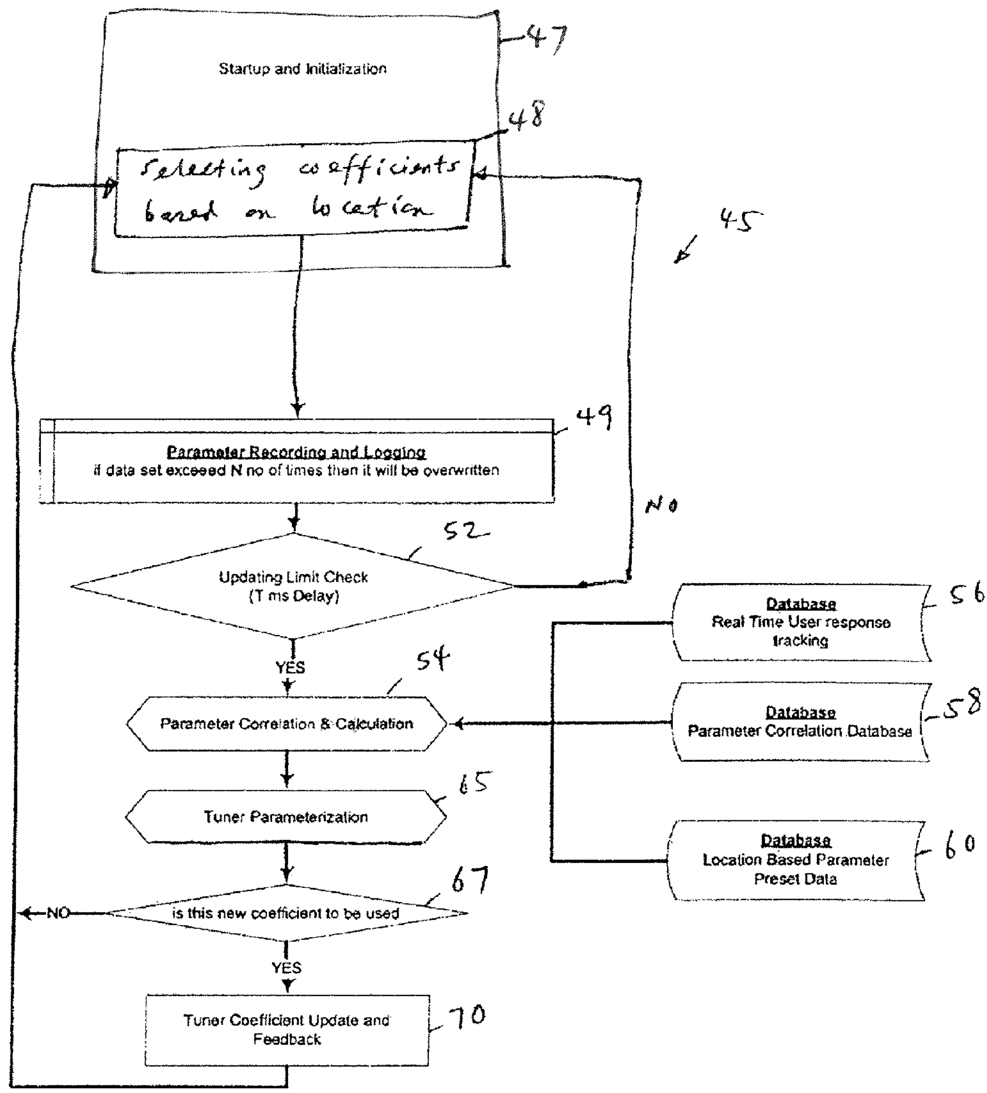
FIG. 2 is a flow chart of steps to operate the tuner unit of FIG. 1.

FIG. 2 shows a flow chart 45 comprising steps to improve audio performance of the tuner unit 10 of FIG. 1. An automobile, in which the tuner unit 10 is installed, may be moving from one location to another whilst the steps of the flow chart 45 are being performed.

The flow chart 45 includes a step 47 of starting up and initializing in which the tuner unit 10 is powered up.

The initializing includes a step 48 of selecting pre-learned or pre-determined parameters assigned to a location of the tuner unit 10. The tuner unit 10 has different sets of configuration parameters that are stored in the memory module 36 of the tuner unit 10 for different locations. For each location, the tuner unit 10 uses the parameters associated for the location. When the tuner unit 10 is used for the first time in a particular location, the tuner unit 10 uses default or initial parametric settings.

The step 48 of selecting pre-determined parameters is followed by a step 49 of recording and logging information to the memory module 36 via a buffer memory. The recorded information includes parametric information and audio performance information together with environmental information of the tuner unit 10. For sake of good order, internal time stamping information for the said information is also included in the recording. FIG. 3 shows a table of the said recorded information.

A maximum size of the recorded information can be predetermined to improve memory usage. When the recorded information maximum size is reached, the oldest recorded information is removed such that the memory space is freed for storing new data.

In order to prevent information of one-time events or glitches from distorting the recorded information, the recorded information is averaged such that effects of the one-time events are reduced or are minimized. The averaging process can be achieved by recording information from the same location two or more times.

Following this, a decision step 52 of checking with predetermined limits is performed. The step 52 compares the recorded information with the pre-determined limits, as illustrated in FIG. 4.

If the recorded information does not exceed any of the pre-determined limits, the step 48 of selecting pre-determined parameters is then performed. In contrast, if the recorded information exceeds one or more of the pre-determined limits, a step 54 of correlating environment information or of correlating performance information is performed, The step 54 of correlating uses data from three different databases. These databases include a real-time user response tracking database 56, a parameter correlation database 58, and a location-based parameter preset data database 60.

In particular, the real-time user response tracking data-base 56 stores information regarding preferences of a user of the tuner unit 10. The preferences include likes and dislikes of the user, daily route or regions travelled by the user, and tuner signal conditions experienced during these travel.

The parameter correlation database 58 has information regarding how the parameters of the tuner unit 10 relate to each other, as illustrated in FIG. 5. The relationships are based on empirical and on experimental values. Certain information of the database 58, such as weather, temperature, and humidity, is provided by sensors, wherein locations of these sensors are shown in the database 58. The relationship shows influence, if any, of information from one block on information from other blocks.

The parametric relationships can be between audio SNR parameter and RFSNR (Radio Frequency Signal to Noise Ratio) parameter and between multipath parameter and RFSNR parameter. A soft mute level parameter can be inversely proportional related to a RFSNR parameter. A soft mute level parameter can be directly proportional related to a multipath parameter.

Consider an example of a linear continuous relationship for a tuner unit, wherein matrix A refers to audio performance measurements of the tuner unit, matrix B refers to relations among parameters of the tuner unit, the tuner parameters includes tuner unit performance measurements, tuner unit parameter settings, and other tuner unit data that can include tuner unit weather conditions, one example of this is shown in FIG. 5, and matrix C refers to relationships between tuner unit parametric settings and tuner unit performance parameters, one example of this is shown in FIG. 6.

The new tuner input parameters can then be calculated since the new tuner parameters are a function of the matrix A, the matrix B, and the matrix C, the new tuner parameters can be calculated from these matrixes.

The new tuner input parameters would be expressed in a one dimension array that can be used directly by the tuner unit.

Embodiments of the matrix A, the matrix B, and the matrix C are shown in FIG. 9, FIG. 10, and FIG. 11 respectively. FIG. 11 shows a possible matrix of new tuner parameters produced by the matrix A, the matrix B, and the matrix C.

This example provides a conceptual description of the application. In practice, multiple intermediate steps may be needed to be taken for deriving the new tuner input parameters.

Consider an example of a non-linear and non-continuous relationship for a tuner unit, wherein a set A represents a set of tuner unit conditions, the conditions include tuner unit performance values and other tuner unit data, a set B represents a set of relationships among tuner unit input parameters, and a set C represents a set of relationships between the tuner unit input parameters and the tuner parameters.

An internal learning algorithm of the tuner unit continuously uses the parameter sets to determine the correlation of the input parameters to the output parameters and to later update the tuner unit with new tuner parameters for operating in all known conditions.

The location-based parameter preset data database 60 has information regarding certain locations or regions that the automobile carrying the tuner unit 10 may travel. The information includes information of transmitters in the region together with its signal strength information and its signal distortion information of these transmitters, multi-path information of the regions, terrain condition information obtained using sensors together with traffic condition information of the region, the traffic condition information being obtained using the TMC 32 of FIG. 1, ambient data of the region obtained using temperature sensors, and other predefined data of the region.

A step 65 of developing new tuner unit parameters is done after the step 54 of correlating environment information or performance information, as illustrated in FIG. 6. In this step, the information from the step 54 of tuner unit parameters are correlated with parameters obtained from sensors to derive the new tuner unit parameters. The derived tuner unit parameters are intended to improve tuner unit performance.

The tuner parameters include a soft mute parameter, a high cut parameter, and a stereo blend parameter, which are illustrated in FIG. 6. The soft mute parameter is used in low signal sensitivity conditions to mute the audio signal in order to prevent static noise from disturbing the listening comfort of the end user. The high cut parameter is used for defining a clamping down of high frequencies in cases where signal strength, multipath, or adjacent channel is beyond a specified level. The stereo blend parameter is used for enhancing an overall listening experience of the user in harsh environments by blending the stereo signal to a mono signal, and then converting the signal back from mono to stereo when the signal conditions get better.

A step 67 of deciding regarding use of the new tuner unit parameters is performed after the step 65 of developing the new tuner unit parameters. The step 67 of deciding includes a step of comparing the new parameters with the current parameters.

If the comparison determines no significant differences between the new parameters and the current parameters, then the step 48 of selecting predetermined parameters based on location is performed. But if the comparison determines one or more differences between the new parameters and the current parameters, then an input from the user is requested. The user input is used to seek permission to accept the new parameters.

If the user does not grant permission to accept the new parameters, then the step 48 of selecting predetermined parameters based on location is performed, as illustrated in FIG. 2.

If the user grants permission to accept the new parameters, then a step 70 of updating tuner unit parameters is performed, as illustrated in FIG. 2. In this case, the current parameters are updated or are replaced with the new parameters. The step 48 of selecting predetermined parameters based on location is performed after the step 70 of updating tuner unit parameters.

The above steps are repeated as the automobile that carries the tuner unit travels. In other words, the tuner unit 10 adapts to changing regions and to different conditions within the region such that its performance is improved.

In summary, the tuner unit 10 that is installed in an automobile can experience different scenarios. The tuner unit 10 is able to adapt in a dynamic manner to these different scenarios using environmental information and performance information. The adaptation is done such that its tuner performs in an optimized manner or performs in an improved manner.

When subjected to different scenarios, the tuner unit 10 would be able to adapt its tuner parameters such that the tuner unit 10 provides its user with an improved listening experience.

Consider one scenario in which the tuner unit 10 experiences changes in signal strength.

An automobile carrying the tuner unit 10 can be driven to a region that is near to a signal transmitter station.

The tuner unit 10 then experiences overly strong signals causing overload-conditions such that the tuner unit 10 produces output audio signals that have high Total Harmonic Distortion (THD). In this case, a sensitivity of the tuner unit 10 can be reduced such that the THD of the output audio signals is reduced.

Alternatively, the automobile can be driven into tunnels or into underground areas in which tuner signals to have very low signal strength. In this case, a signal sensitivity of the tuner unit 10 can be increased to bring the level of the tuner signals to its normal operating level.

In practice, the tuner unit 10 uses a set of tuner parameters that are previously stored. The tuner parameters are assigned to the particular region that the tuner unit is located.

The tuner unit parameters and associated performance data are then recorded together with internal time stamping data while the automobile travels in the region. The recorded performance data are also averaged to reduce possible effects of glitches.

The tuner unit 10 later compares the recorded data against corresponding predetermined high or low limits. When the recorded data exceeds the predetermined limits, the tuner unit 10 would perform parameter correlation as described in the above flowchart 45. The tuner unit 10 afterward determines or derives new tuner parameters for signal sensitivity that corresponds to the exceeded data. Specifically, values of the soft mute parameter can be changed to achieve low signal sensitivity.

The tuner unit 10 afterward compares the new derived parameters to the existing corresponding parameters. If the comparison shows sufficient difference between the parameters, then a user is prompted for a decision regarding use of the new parameters. The new parameters are used if the user chooses to use the new parameters.

The above steps are then repeated again.

This is manner, the tuner unit 10 adapts in an intelligently manner to changes in signal field strength and in signal THD. The adaptation is achieved by changing the parameters of signal sensitivity of the tuner unit 10 in response to a weak signal or an overly strong signal.

The updated parameters allow the user to have improved listening experience. In general, continually repeating the steps would adapt the tuner unit 10 continually to changing conditions within the region and to conditions of different regions.

Consider another scenario in which an automobile experiences signal interferences due to multipath or to weather conditions. The multipath refers to a signal propagation phenomenon whereby a radio signal reaches an antenna by two or more different paths as a result of reflections from one or more objects, thereby causing the antenna to receive a distorted radio signal.

The automobile can travel in a region with high humidity such that the multipath is reduced. The automobile can also travel in a region that has a weather condition causing the multi-path to be high.

Similar to the previous scenario, the tuner unit 10 would retrieve and also use previously stored tuner parameters that are assigned to the region the automobile is located. The tuner unit 10 then records the tuner unit parameters, tuner unit performance information, and environmental information along with its internal time stamping information while the automobile travels in the region.

These data are then compared against upper or lower limits that are set for multipath, for reference & Actual Altitude, for GPS signal strength, and for number of satellites.

When one or more of the limits are exceeded, the tuner unit 10 then determines new tuner parameters. In particular, parameter of "attack time", which defines a rate of bandwidth increase, and parameter of "release time", which defines a rate of bandwidth shrinks, can be adjusted by changing a parameter of a stereo blend parameter of a DSP of the tuner unit 10 to remove or to reduce effects of the signal multipath.

The tuner unit 10 afterward determines whether the new tuner parameters are similar with the existing tuner parameters. The stereo blend parameter is then considered for adjusting if the new stereo blend parameter is sufficiently different from the present stereo blend parameter. The user is later prompted for a decision about accepting the new stereo blend parameter. The new stereo blend parameter is accepted if the user accepts the new stereo blend parameter.

The above steps are later repeated again.

As can be seen from the above description, the embodiment has an advantage of using parts of most existing architecture or infrastructural of automotive tuner unit to improve tuner unit performance, without requiring additional hardware investment.

The tuner unit 10 also has a benefit of providing a self-learning feature, also called a parameter adjustment feature. This feature allows the tuner unit 10 to be used in different locations or regions while experiencing various different environmental conditions since the tuner unit is able to adapt its tuner unit parameters for improving tuner unit performance. Field-testing of the tuner unit 10 does not need to be performed at these locations or these regions. Put differently, specific databases of tuner unit parameter do not need to be developed for these various locations.

In addition, the tuner unit 10 increases tuner accuracy since environment information, which is collected, can be taken into consideration for improving the tuner unit performance. Because of this, listening experience of the end user is also improved.

Another benefit of the embodiment is that it allows end-user inputs or interactions to adjust and to accept new tuner unit parameters in accordance with their preferences at these various different locations in a dynamic manner.

These steps are different from other tuners in which tuner parameters are fixed. These tuner parameters then are suitable for only a certain type or a certain range of environmental conditions. An end-user may be subjected faced to unpleasant hearing experience when the environmental situation conditions falls outside the certain range of environmental conditions.

Figure 7:
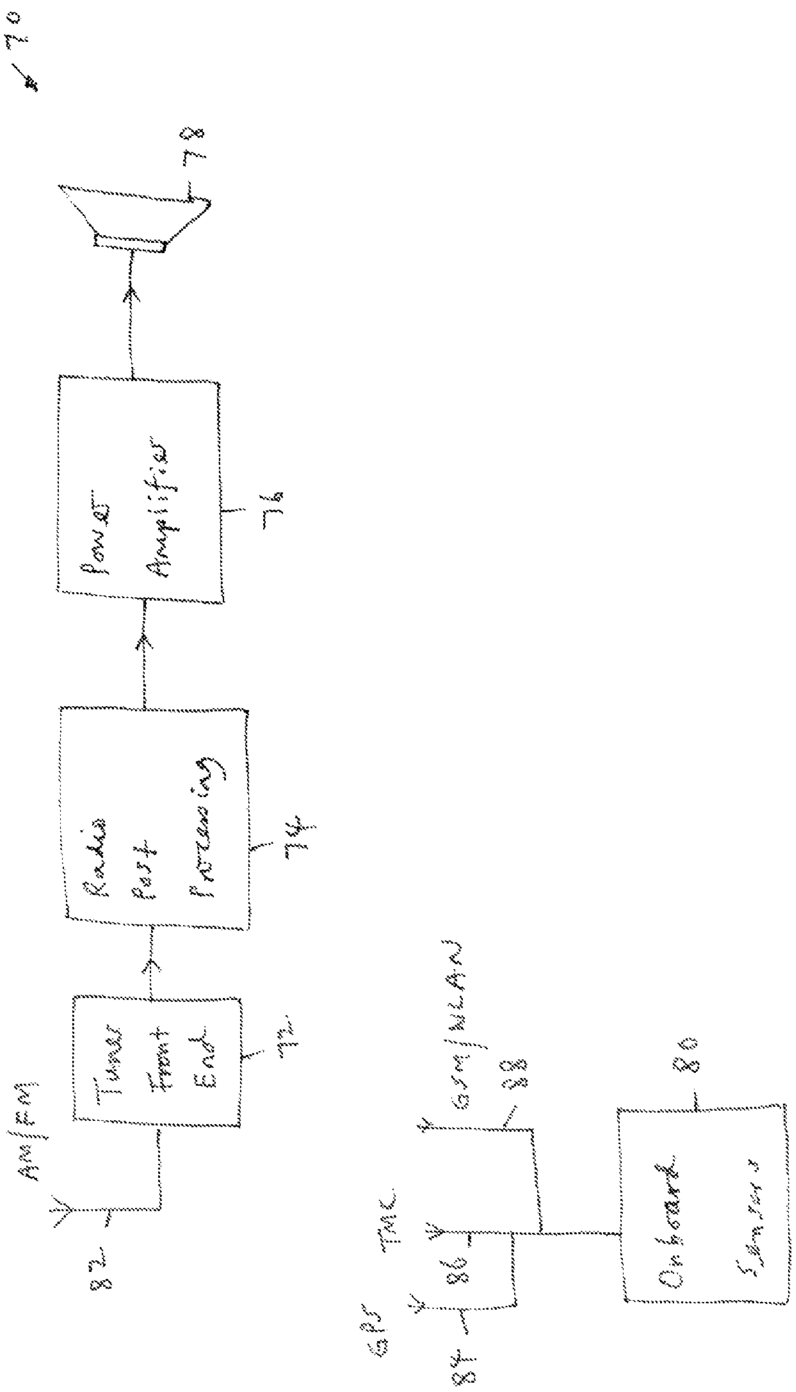
FIG. 7 is a block diagram of a radio that uses the tuner unit of FIG. 1.

FIG. 7 shows a block diagram 70 of a radio that uses the tuner unit of FIG. 1.

The block diagram 70 includes a tuner front end block 72 connected to a radio post processing block 74. The radio post processing block 74 is connected to a power amplifier 76 that is connected to a loudspeaker 78. The block diagram 70 also includes an onboard sensor block 80.

An AM (amplitude modulation)/FM (frequency modulation) antenna 82 is connected to the tuner front end block 72 while a GPS (Global Positional System) antenna 84, a TMC Traffic Message Channel) antenna 86, and a GSM (Global System for Mobile Communications)/WLAN (Wireless Local Area Network) antenna 88 are connected to the onboard sensor block 80.

In use, the onboard sensors 80 are used for generating location, tuner performance, environmental, and user preference information of the radio.

In particular, the radio location information relates to positional information of the radio.

The tuner performance information relates to audio qualities of signals produced by the radio. The environmental information includes surrounding temperature, humidity, and pressure information. The user preference information relates to tuner choices selected by the user.

The tuner front end block 12 is used for receiving radio signals from the AM/FM antenna 82 and for processing the received radio signals using input tuner parameters. In particular, the AM/FM antenna 12 receives radio signals. The tuner front end 72 receives the radio signals and filters the received radio signals such that only a certain frequency bandwidth of the radio signals are transmitted to the radio post processing 74.

The radio post processing block 74 is used for receiving the processed radio signals and for processing these received radio signals.

The power amplifier block 76 is used for driving or electrically powering the loudspeaker 78 using the processed radio signals.

Figure 8:
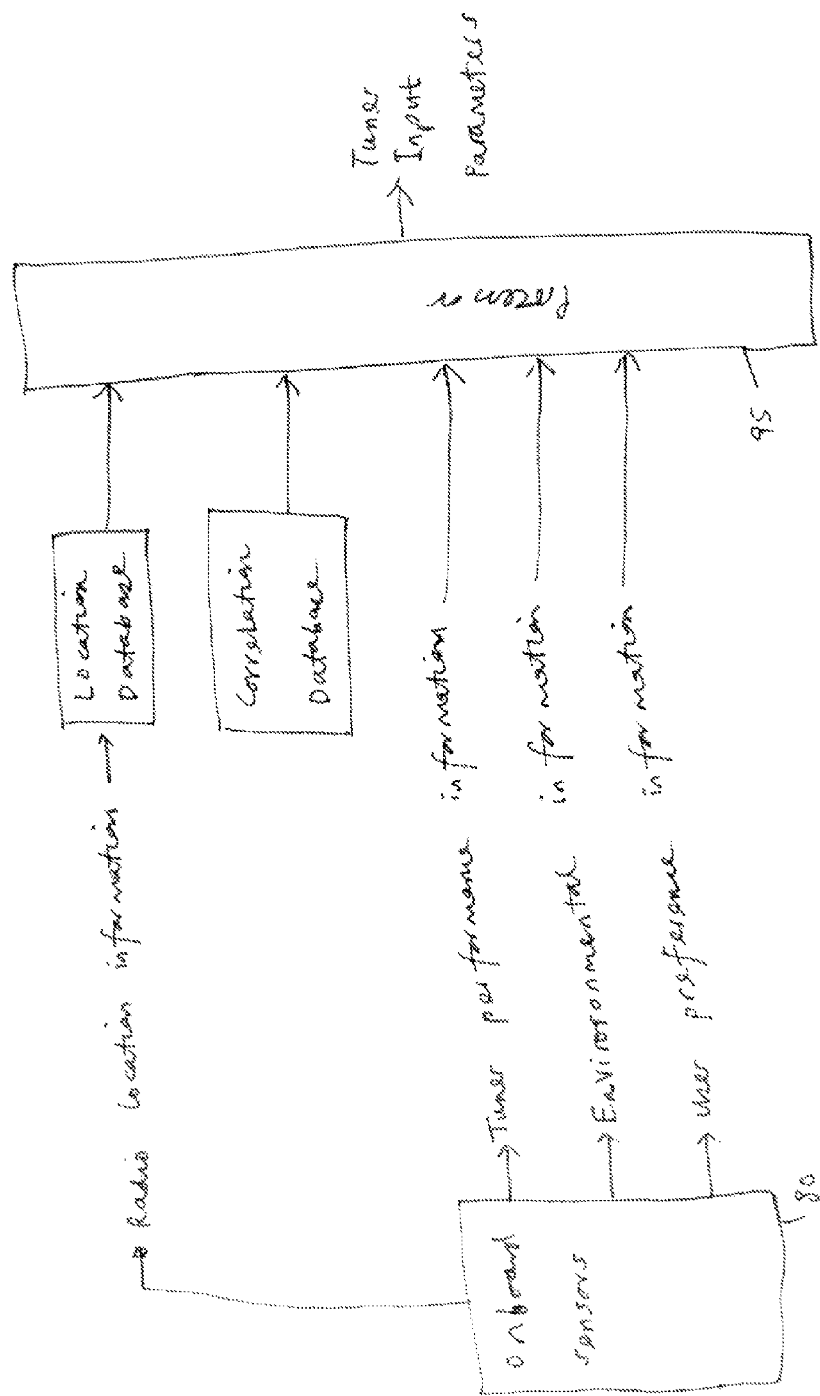
FIG. 8 is a processor for generating tuner input parameters for the block diagram of FIG. 7.

FIG. 8 shows one possible method of deriving input tuner parameters for the block diagram 70 of FIG. 7.

As illustrated in FIG. 8, a processor 95 produces the input tuner parameters using region information from a location database, tuner performance information, and information from a correlation database.

The location database produces region information using radio location information from the onboard sensors 80. As an example, the onboard sensors 80 produce geographical position coordinates of the radio. The location database has geographical position coordinates of regions.

Using the radio position coordinates, the location database produces regional information of the radio position coordinates.

The tuner performance information is generated by the onboard sensors of FIG. 7. The tuner performance information includes audio SNR information and audio THD information.

The correlation database stores several sets of relationships or correlations for different regions. The relationship refers to interaction or influence between the tuner performance parameters and the input tuner parameters. Due to different terrain and due different signal conditions of the different regions, a different relationship is assigned to each region.

The processor 95 is used for producing tuner input parameters using the information from the location database, information from the correlation database, and the tuner performance information.

The production of the tuner input parameters can also use the environmental information and the user preference information, both of which are generated by the onboard sensors 80. The user preference information can, for example, determine frequency of generation of the tuner input parameters.

Figure 13:
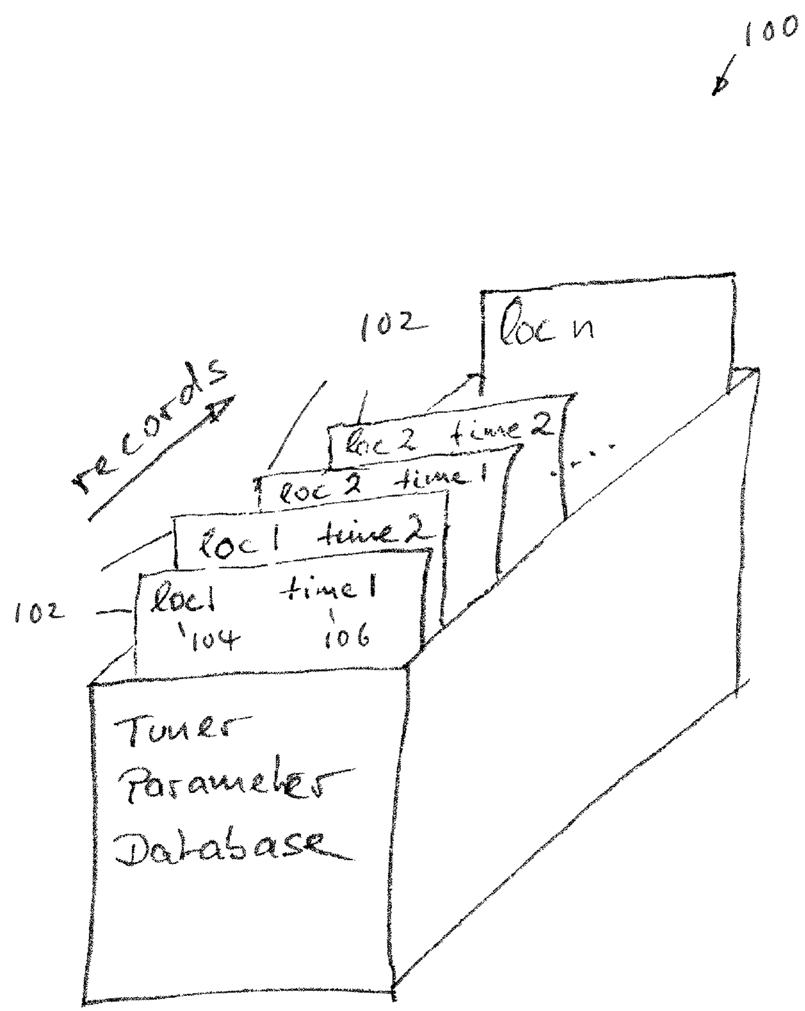
FIG. 13 is a database for the tuner unit of FIG. 1'.

FIG. 13 shows illustrates a database 100 for the tuner unit of FIG. 1.

The database 100 includes a plurality of data records 102. Each data record 102 comprises a location field 104 and a time field 106. The data record 102 also has a relationship field and a correlation field. The relationship field and a correlation field are not illustrated in FIG. 13.

The location field 104 contains tuner location data. The time field 106 contains time stamp data. The relationship field contains relationship information for determining a tuner front-end section parameters based on sensor signals. The correlation field contains correlation information among sensor signals.

In use, the database 100 provides one way to arrange tuner information. The location data and the time data are used for retrieving or obtaining the relationship information or the correlation information.

One of method of using the database 100 includes a step of a tuner reaching a certain location and a certain time. The tuner then retrieves the relevant data record using the certain location and the certain time. The location and time information are used search keys to obtain the data record. After this, the relationship information or the correlation information of the retrieved data record is used by the tuner.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

The invention claimed is:

1. A mobile radio receiver for a vehicle comprising:

a tuner front-end section;

a location data port configured to receive tuner location data;

a sensor port configured to receive at least one sensor signal; and a data processing unit operably connected to:

the tuner front-end section, the location data port, and the sensor port, the data processing unit further comprising:

at least two predetermined tuner location data and at least two pre-determined relationship data sets for determining a set of tuner front-end section parameters based on the at least one sensor signal, wherein the mobile radio receiver provides an operational mode, a checking mode, a tuner parameter adjustment mode, and a tuner parameter application mode, in the operational mode, the tuner front-end section operates according to at least one set of tuner front-end section parameters, in the checking mode, the data processing unit checks the at least one sensor signal against at least one predetermined threshold, such that the mobile radio receiver enters the parameter adjustment mode when the at least one sensor signal exceeds the at least one predetermined threshold, in the tuner parameter adjustment mode, the data processing unit determines a new set of tuner front-end section parameters based on the tuner location data, a relationship data set, and the at least one sensor signal, and in the tuner parameter application mode, the data processing unit updates the tuner front-end section with the new set of tuner front-end section parameters.

2. The mobile radio receiver according to claim 1, wherein the tuner location data comprises actual geographic data.

3. The mobile radio receiver according to claim 1, wherein the tuner location data comprises actual time data.

4. The mobile radio receiver according to claim 1, wherein the data processing unit comprises at least two tuner parameter records, each tuner parameter records comprising a predetermined tuner location data and a pre-determined relationship data set, wherein in the parameter adjustment mode, the data processing unit determines a new set of tuner front-end section parameters by retrieving a tuner parameter record using the tuner location data and by generating the new set of tuner front-end section parameters with the tuner parameter record.

5. The mobile radio receiver according to claim 1, wherein the data processing unit further comprises a predetermined set of correlations among at least two sensor signals, and wherein in the tuner parameter adjustment mode, the data processing unit determines a new set of tuner front-end section parameters based at least in part on the tuner location data, a relationship data set, the sensor signal, and the set of correlations.

6. The mobile radio receiver according to claim 5, wherein the data processing unit comprises at least two correlation records, each correlation record comprising a predetermined tuner location data and a predetermined set of correlations, and wherein in the turner parameter adjustment mode, the data processing unit determines a new set of tuner front-end section parameters by retrieving a correlation record using the tuner location data and by generating the new tuner front-end section parameters with the set of correlation of this correlation record.

7. The mobile radio receiver according to claim 1, wherein the sensor port receives at least one internal measurement signal.

8. The mobile radio receiver according to claim 1, wherein the sensor port receives at least one external measurement signal.

9. The mobile radio receiver according to claim 1, wherein in the checking mode the data processing unit checks the tuner location data against predetermined location data, and wherein the mobile radio receiver enters the tuner parameter adjustment mode when the tuner location data is different than the predetermined location data.

10. The mobile radio receiver according to claim 1, wherein the timer front-end parameters comprise a signal sensitivity parameter.

11. The mobile radio receiver according to claim 1, further comprising:

an input device configured to receive an input from a user to grant permission for accepting the new tuner front-end parameter.

12. A method of operating a mobile radio receiver for a vehicle, comprising:

operating a front-end section according to at least one predetermined tuner front-end section parameter, checking at least one sensor signal against at least one threshold such that the mobile radio receiver performs a parameter adjustment when the at least one sensor signal exceeds the at least one threshold, determining a new set of tuner front-end section parameters based at least in part on tuner location data, a relationship data set, and the at least one sensor signal, and wherein the parameter application comprises updating the tuner front-end section with the new set of tuner front-end section parameter.

13. The method according to claim 12, further comprising recording sensor signal data.

14. The method according to claim 13, wherein the sensor signal data is recorded together with time data.

15. The method according to claim 14, wherein the recorded sensor signal data is averaged.

16. The method according to claim 12 further comprising:

checking the tuner location data against predetermined location data such that the mobile radio receiver enters parameter adjustment mode when the tuner location data is different from the predetermined location data.

17. The method according to claim 12, further comprising:

requesting permission from a user to apply the new tuner front-end parameter.

18. The method according to claim 17, further comprising:

checking whether the new tuner front-end parameter is different than the predetermined tuner front-end parameter such that the mobile radio receiver enters an operation when the checking determines that the new tuner front-end parameter is a same as the predetermined tuner front-end parameter.

* * * * *